United States Patent [19]

Wolfe

[11] 4,270,339
[45] Jun. 2, 1981

[54] VARIABLE WIDTH TOOL ATTACHMENT FOR USE WITH A VEHICLE

[76] Inventor: Hunter Wolfe, 121 Yardley Ave., Fallsington, Pa. 19054

[21] Appl. No.: 876,313

[22] Filed: Feb. 9, 1978

[51] Int. Cl.³ .................... D01H 13/00; E01H 5/00
[52] U.S. Cl. ................................ 56/95; 56/53; 37/43 E; 37/43 G; 172/532; 172/540; 172/673; 414/722
[58] Field of Search ........ 37/80 R, 80 A, 81, DIG. 3, 37/DIG. 16, 41–50, 117.5, 191 A, 192 R, 192 A, 118 R, 118 A, 141 R; 172/734, 532, 736, 739, 741–744, 666, 667, 673, 800–809, 540, 550; 299/52, 61, 80, 83, 84; 414/487, 722, 552; 56/95, 94, 53–55

[56] References Cited

U.S. PATENT DOCUMENTS

| 789,512 | 5/1905 | Waller | 299/84 X |
|---|---|---|---|
| 2,363,969 | 11/1944 | Jones | 299/82 X |
| 3,614,162 | 10/1971 | Teeter | 299/84 X |
| 3,807,064 | 4/1974 | Schmidt, Jr. | 37/50 X |
| 3,845,517 | 11/1974 | Harris | 172/673 X |
| 4,081,095 | 3/1978 | Wilburn et al. | 414/552 |

FOREIGN PATENT DOCUMENTS

| 603735 | 8/1960 | Canada | 37/43 G |
|---|---|---|---|
| 629099 | 10/1961 | Canada | 37/43 B |
| 1015307 | 12/1965 | United Kingdom | 172/736 |
| 308157 | 7/1971 | U.S.S.R. | 37/118 R |
| 435324 | 11/1974 | U.S.S.R. | 37/141 R |
| 534552 | 11/1976 | U.S.S.R. | 37/118 R |

*Primary Examiner*—E. H. Eickholt

[57] ABSTRACT

A variable width tool attachment for use with a vehicle is herein described as generally comprising a complete tool which is split vertically and in the direction of vehicle travel to form two half tools. The two half tools are slidably mounted for mutual relative movement in the direction normal to the direction of vehicle travel, i.e, in the direction of tool width. A hydraulic ram cylinder or the like is operable to move the two half tools to form the desired width.

In one form of the invention, a horizontal cutting header is provided with a chain cutter and a chain drive having at least one moveable idler sprocket to take-up and let-out chain in the width direction whenever the width of the tool is varied.

2 Claims, 5 Drawing Figures

VARIABLE WIDTH TOOL ATTACHMENT FOR USE WITH A VEHICLE

BACKGROUND OF THE INVENTION

The present invention relates to tool attachments for use with vehicle. Such tool attachments include plows, ditch digger buckets, harvester cutters, and the like. More specifically, the present invention relates to such tool attachments having a variable width feature.

Typically, the farmer or construction firm needs to have a large variety of vehicles and tool implements for such vehicles. For example, when one is digging a ditch for irrigation or for constructing laterals for a septic system, specific widths are often required (e.g., 1½ feet, 3 feet, etc.). Therefore, it is necessary to have digging buckets of several widths to provide the specific size ditch which may be required by an engineer's specifications.

The same general considerations attend the use of earth moving plows and it is likewise desirable for a farmer to have horizontal cutting headers of various widths. Needless to say, such implements are expensive and each requires a great deal of maintenance. Therefore, it would be advantageous if the number of such implements required could be reduced.

OBJECTS AND SUMMARY OF THE INVENTION

Accordingly, it is an object of the present invention to provide a variable width tool for use with vehicles which tool would obviate the need for having several of such tools of different widths.

It is another object of the present invention to provide a variable width tool for use with vehicles which tool is uncomplicated, easy to manufacture and far less expensive than the corresponding expense of maintaining several widths of the same tool.

At least some of the above objects are achieved by the provision of a variable width tool attachment for use with a vehicle comprising a complete tool split vertically and in the direction of intended vehicle travel to form two half tools. Means is provided for slidably mounting the two half tools for mutual relative movement in the direction normal to the direction of intended vehicle travel which is the width direction of the tool. A hydraulic cylinder or the like is provided to move to two half tools relative to each other in the width direction.

In one feature of the invention, a continuous link chain with cutting blades may be provided. A take-up idler sprocket arrangement may be provided to maintain the cutting segment of the chain in proper tension for cutting after the tool has been adjusted from one width to another.

Additional means may be provided for adjustably telescoping the remaining elements of the overall attachment.

BRIEF DESCRIPTION OF THE DRAWINGS

While the invention is particularly pointed out and distinctly claimed in a concluding portion of the specification, a preferred embodiment is set forth in the following detailed description which may be best understood when read in connection with the accompanying drawings in which:

DETAILED DESCRIPTION OF THE PREFERRED EMBODIMENT

Figure 1:
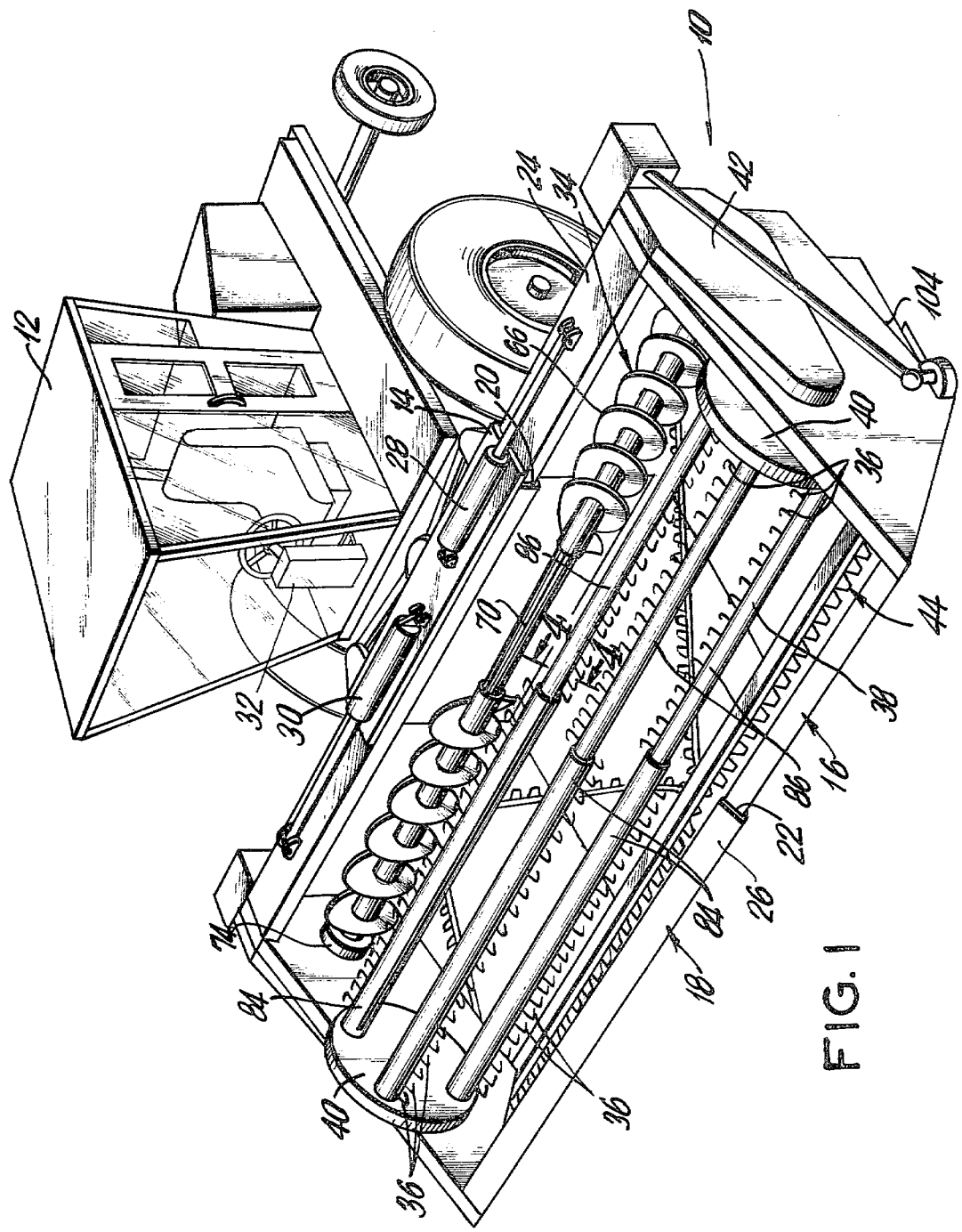
FIG. 1 is a perspective view of a vehicle fitted with an attachment according to the present invention.

Referring now to the drawings in which like numerals are used to indicate like parts throughout the various views thereof, FIG. 1 shows a header attachment constructed in accordance with the present invention.

In order to customize the width of such a header to the nature of the job to be performed, a variable width header is provided comprising systems, each of which is formed to present and compensate for various widths. Such an arrangement is especially useful when working with triangular sections or when driving a vehicle with an attached header along a public highway.

THE HOUSING

Essentially, the overall housing may be formed generally in the conventional shape and may be attachable to a vehicle 12 by a conventional coupling. The overall housing 10 includes a central generally L-shaped support member 14 which is attached to the vehicle and which slidingly supports two halves 16 and 18 of the overall housing 10. The two halves are formed to define a complete housing and are provided with channel and groove slidable fittings 20 and 22 along the upper rims 24 and 26 thereof.

Hydraulic rams 28 and 30 or the like may be used to slide the two halves 16 and 18 to a desired width by the use of controls 32 in the vehicle 12. As shown in FIG. 1, one end of each ram is anchored to the L-shaped member 14 and the second end of each is attached to one of each of the halves 16 and 18.

Within the housing 10 are operably installed adjustably sized elements including a screw feed element 34 or "auger", for moving cut material such as cut corn toward the rear and center area of the housing for removal. Likewise, rotatable fingers 36 are mounted on variable width rods 38 between rotatable drums 40. The drums 40 are driven by a chain drive housed within housing 42, the power to which may be applied in the conventional manner.

Finally, transverse cutting element 44 is provided comprising a chain saw type cutting arrangement.

Figure 2:
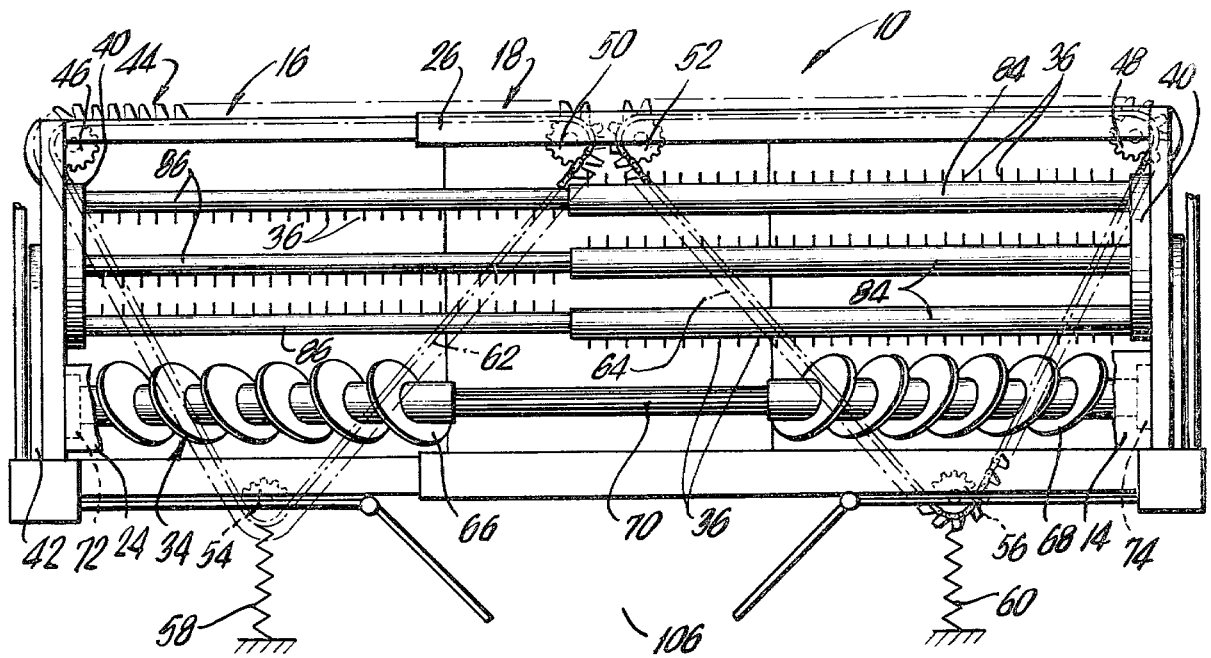
FIG. 2 is a plan sectional view of the attachment shown in FIG. 1 taken along line 2—2.

Referring to FIG. 2, the overall chain cutting arrangement 44 according to the present invention is shown in plan view. Sprockets 46 and 48 are fixed in the front corners of the overall housing 10. Sprockets 50 and 52 are rotatably mounted on the inside of the L-shaped support member 14 so that the axis of rotation sprockets 50 and 52 are at all times fixed and, of course, since sprockets 46 and 48 are rotatably mounted on the sliding housing portions 16 and 18, the axes of rotation thereof are movable as the width of the overall arrangement is varied.

Take-up sprockets 54 and 56 are provided at the rear of the overall housing as shown in FIG. 2, and are mounted by a conventional spring bias means 58 and 60.

The sprockets 54 and 56 are biased to the rear and away from the sprockets 46-52 so that, when the overall arrangement is narrowed for width, i.e., when sprocket 46 moves toward sprocket 50 and sprocket 48 moves toward sprocket 52, the cutting chains 62 and 64 are maintained in a taut cutting posture along the leading edge of the arrangement. The chain cutters 62 and 64 are disposed in a horizontal posture beneath the rotary fingers 36 and the feed screw or auger 34. The detailed configuration of the chain cutters will be described in more detail with respect to FIG. 5.

THE SCREW FEED AUGER

Referring briefly to FIGS. 1 and 2, the screw feeding auger element 34 generally comprises a telescoping member whereby portions 66 and 68 fit over and mate with a splined rod 70 but are otherwise unattached thereto to permit longitudinal movement of the screw element 66 and 68 with respect to the splin 70. The screw element 66 and 68 are journaled for rotation within the outer walls of the housing 10 at 72 and 74. Through this arrangement, the elements 66 and 68 may freely rotate but will not move axially with respect to the elements 16 and 18 of the housing.

Figure 3:
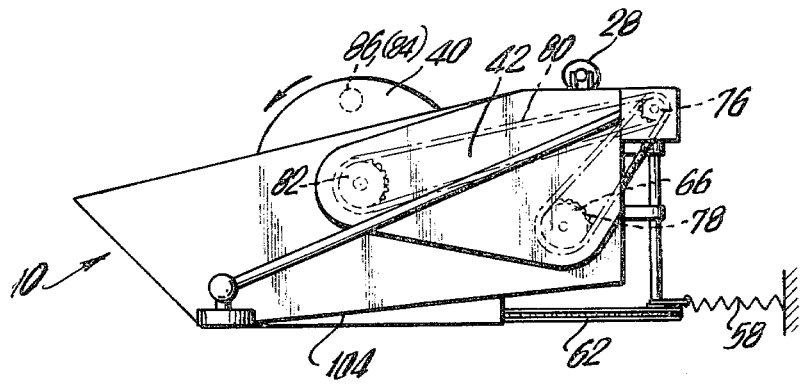
FIG. 3 is a side elevation view of the attachment shown in FIG. 1.

Referring briefly to FIG. 3, the chain drive for the auger 34 is shown wherein power is supplied through sprocket 76 to drive sprocket 78 which may be attached in drive relationship to the screw member 66. Of course, such a chain drive arrangement may be provided on both sides of the housing to provide balance of power distribution. It will be noted that an additional chain 80 is driven from sprocket 76 to drive sprocket 82 which, in turn, drives the drum 40.

THE GATHERING FINGERS

Figure 4:
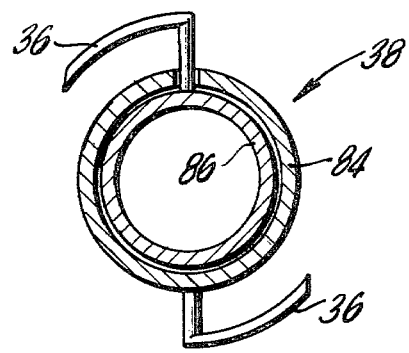
FIG. 4 is a radial sectional view of a finger member of the attachment shown in FIG. 1 taken along line 4—4.

Referring now to FIG. 4, it can be seen that the rods 38 comprise coaxial, longitudinally slidable members 84 and 86 which are provided with depending fingers 36 mounted thereon.

Referring briefly to FIG. 2, the coaxial elements 84 and 86 are journaled for rotation within the drum 40 so as to be axially fixed with respect thereto. Thus, the elements 84 and 86 are provided free relative movement as to each other in a telescoping manner when the drums 40 are moved axially closer or further away from each other. The sprocket 82 turns drum 40 and the elements 84 and 86 revolve and rotate freely without any drive power applied directly thereto under the gravity force upon the fingers 88.

THE CUTTER ARRANGEMENT

Referring to FIG. 2, the cutter arrangement 44 including continuous chain saw loops 62 and 64 is shown in a generally operational posture. In FIG. 3, it is seen that the cutting loops 62 and 64 are disposed in a horizontal plane beneath the header housing and that sprocket 46 may be driven by sprocket 76.

Figure 5:
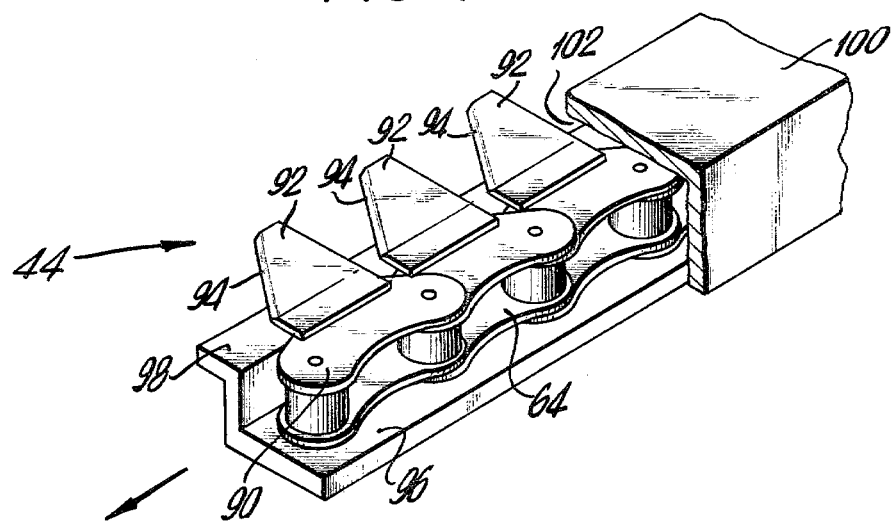
FIG. 5 is a cut-away showing of a cutter arrangement according to the present invention.

Referring now to FIG. 5, cutter 64 is shown as comprising link chain 90 having beveled blades 92 which are beveled along leading edges 94 thereof. The chain is supported for movement along channel member 96 having a lip 98 for guiding blades 92. A guard channel 100 is disposed over the chain and positioned to define a horizontal opening 102 through which the cutting blades 92 project as they move along the channel 96.

In operation, the hydraulic rams 28 and 30 are activated to adjust the position of elements 16 and 18 to a desired width. Through this operation, the take-up sprockets 54 and 56 permit the length of cutting chain between the sprockets 52 and 48 and between 46 and 50 to be varied while maintaining cutting tension. The screw elements 66 adn 68 are moved axially along the spline 70 and the coaxial elements 84 and 86 supporting the depending fingers 36 are moved in telescoping fashion to adjust for the new width.

As the vehicle moves forward, cut crop is deposited on the ramp-like floor 104 (FIG. 3) of the housing. Fingers 36 depending from the telescoping members 84 and 86 of drum 40 grab the crop and move it rearwardly toward the auger elements 66 and 68. The elements 66 and 68 screw feed the crop toward the center and rear of the housing and ultimately urge the crop through a rear opening 106 in the housing where the crop exits the header attachment.

While what has been shown herein is a preferred embodiment of a variable width header attachment, it is to be understood that various modifications and changes may be made therein without departing from the invention. For example, the present invention may be applied to a plow or to a bucket for a ditch digger in exactly the same fashion as the more complicated header arrangement shown herein. Of course, the less complicated plow or bucket would not necessarily have gathering fingers, an auger or a cutting chain. But such a plow or a bucket would have the identical variable width housing features shown herein.

It is therefore, intended to cover in the following claims all such modifications and changes as may fall within the true spirit and scope of the present invention.

What is claimed is:

1. A variable width tool attachment for use with a vehicle comprising an overall tool formed by two tool portions, said two tool portions being slidably mounted for mutual relative movement in the direction generally normal to the direction of intended vehicle travel, means operatively associated with said overall tool to move said two tool portions relative to each other in the direction generally normal to the direction of intended vehicle travel, said two tool portions being slidably movable from a first position forming an overall tool of minimum width to a second position forming an overall tool of maximum width, said two tool portions being aligned generally coincidently and formed with means for storing at least a part of one said tool portion within the other said tool portion when said overall tool is in said first position of minimum width, said two tool portions being formed and aligned to present, in both said first position and said second position, an overall tool having a substantially continuous and uninterrupted lower lip for scooping matter immediately contiguous the earth surface over which the vehicle is driven, finger gathering means comprising a driven rotatable drum having telescoping bars freely rotating therein and revolving thereon, said bars comprising concentric cylindrical members being C-shaped in cross section and formed with fingers extending radially outwardly from the opened portion of each C-shaped cross section, the fingers of one portion of each telescoping bar being positioned to fit within said space portion of the remaining part of the telescoping bar upon the compression of one bar within the other.

2. A variable width tool attachment according to claim 1, including a screw feed mechanism comprising two screw feed members arranged to move crop toward each other provided with a drive means and mounted on a spline member for mutual relative movement toward each other and simultaneously fixed rotational movement.

* * * * *